United States Patent
Bruhn et al.

(10) Patent No.: US 8,195,449 B2
(45) Date of Patent: Jun. 5, 2012

(54) LOW-COMPLEXITY, NON-INTRUSIVE SPEECH QUALITY ASSESSMENT

(75) Inventors: Stefan Bruhn, Sollentuna (SE); Volodya Grancharov, Uppsala (SE); Willem Bastiaan Kleijn, Stocksund (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 979 days.

(21) Appl. No.: 12/162,858

(22) PCT Filed: Jan. 30, 2007

(86) PCT No.: PCT/SE2007/000080
§ 371 (c)(1),
(2), (4) Date: Jul. 31, 2008

(87) PCT Pub. No.: WO2007/089189
PCT Pub. Date: Aug. 9, 2007

(65) Prior Publication Data
US 2009/0018825 A1    Jan. 15, 2009

Related U.S. Application Data

(60) Provisional application No. 60/763,383, filed on Jan. 31, 2006.

(51) Int. Cl.
G10L 11/00    (2006.01)
G10L 19/00    (2006.01)
G10L 21/00    (2006.01)
G10L 11/04    (2006.01)
G10L 11/06    (2006.01)
G10L 19/06    (2006.01)
G10L 19/14    (2006.01)
G10L 21/02    (2006.01)
G10L 15/00    (2006.01)
G10L 15/20    (2006.01)

(52) U.S. Cl. .............. 704/200.1; 704/200; 704/201; 704/205; 704/207; 704/208; 704/209; 704/210; 704/211; 704/214; 704/215; 704/219; 704/226; 704/227; 704/231; 704/233

(58) Field of Classification Search .............. 704/200, 704/201, 205, 207, 208, 209, 210, 211, 214, 704/215, 219, 226, 227, 231, 233, 200.1
See application file for complete search history.

(56) References Cited

U.S. PATENT DOCUMENTS 6,446,038 B1 * 9/2002 Bayya et al. .......... 704/232
6,577,996 B1 * 6/2003 Jagadeesan .......... 704/236
(Continued)

OTHER PUBLICATIONS

L. Malfait, J. Berger, and M. Kastner, "P.563—The ITU-T standard for single-ended speech quality assessment," IEEE Trans. Audio, Speech, Lang. Process., vol. 14, No. 6, pp. 1924-1934, Nov. 2006.*

Primary Examiner — Paras Shah

(57) ABSTRACT

A non-intrusive signal quality assessment apparatus includes a feature vector calculator that determines parameters representing frames of a signal and extracts a collection of per-frame feature vectors (φ;(n)) representing structural information of the signal from the parameters. A frame selector preferably selects only frames (Ω\with a feature vector (φ;(n)) lying within a predetermined multi-dimensional window (Θ). Means determine a global feature set (ψ) over the collection of feature vectors (φ;(n)) from statistical moments of selected feature vector components ((1^,02, ... O11). A quality predictor predicts a signal quality measure (Qj from the global feature set (ψ)).

16 Claims, 4 Drawing Sheets

U.S. PATENT DOCUMENTS

| | | | |
|---|---|---|---|
| 7,164,771 B1 * | 1/2007 | Treurniet et al. | 381/56 |
| 7,315,812 B2 * | 1/2008 | Beerends | 704/200.1 |
| 7,406,419 B2 * | 7/2008 | Malfait | 704/270 |
| 7,606,704 B2 * | 10/2009 | Gray et al. | 704/226 |
| 2002/0059065 A1 * | 5/2002 | Rajan | 704/226 |
| 2004/0153315 A1 * | 8/2004 | Reynolds et al. | 704/208 |

* cited by examiner

LOW-COMPLEXITY, NON-INTRUSIVE SPEECH QUALITY ASSESSMENT

This application claims the benefit of U.S. Provisional Application No. 60/763,383, filed Jan. 31, 2006, the disclosure of which is fully incorporated herein by reference.

TECHNICAL FIELD

The present invention relates to non-intrusive signal quality assessment and especially to non-intrusive speech quality assessment.

BACKGROUND

Speech quality assessment is an important problem in mobile communications. The quality of a speech signal is a subjective measure. It can be expressed in terms of how natural the signal sounds or how much effort is required to understand the message. In a subjective test, speech is played to a group of listeners, who are asked to rate the quality of this speech signal, see [1], [2].

The most common measure for user opinion is the mean opinion score (MOS), obtained by averaging the absolute category ratings (ACR). In ACR, listeners compare the distorted signal with their internal model of high quality speech. In degradation MOS (DMOS) tests, the subjects listen to the original speech first, and then are asked to select the degradation category rating (DCR) corresponding to the distortion of the processed signal. DMOS tests are more common in audio quality assessment, see [3], [4].

Assessment of the listening quality as described in [1]-[4] is not the only form of quality of service (QoS) monitoring. In many cases conversational subjective tests, see [2], are the preferred method of subjective evaluation, where participants hold conversations over a number of different networks and vote on their perception of conversational quality. An objective model of conversational quality can be found in [5]. Yet another class of QoS monitoring consists of intelligibility tests. The most popular intelligibility tests are the Diagnostic Rhyme Test (DRT) and Modified Rhyme Test (MRT), see [6].

Subjective tests are believed to give the "true" speech quality. However, the involvement of human listeners makes them expensive and time consuming. Such tests can be used only in the final stages of developing the speech communication system and are not suitable to measure QoS on a daily basis.

Objective tests use mathematical expressions to predict speech quality. Their low cost means that they can be used to continuously monitor the quality over the network. Two different test situations can be distinguished:

Intrusive, where both the original and distorted signals are available. This is illustrated in FIG. 1, where a reference signal is forwarded to a system under test, which distorts the reference signal. The distorted signal and the reference signal are both forwarded to an intrusive measurement unit 12, which estimates a quality measure for the distorted signal.

Non-intrusive (sometimes also denoted "single-ended" or "no-reference"), where only the distorted signal is available. This is illustrated in FIG. 2. In this case a non-intrusive measurement unit 14 estimates a quality measure directly from the distorted signal without access to the reference signal.

The simplest class of intrusive objective quality measures are waveform-comparison algorithms, such as signal-to-noise ratio (SNR) and segmental signal-to-noise ratio (SSNR). The waveform-comparison algorithms are simple to implement and require low computational complexity, but they do not correlate well with subjective measurements if different types of distortions are compared.

Frequency-domain techniques, such as the Itakura-Saito (IS) measure, and the spectral distortion (SD) measure are widely used. Frequency-domain techniques are not sensitive to a time shift and are generally more consistent with human perception, see [7].

A significant number of intrusive perceptual-domain measures have been developed. These measures incorporate knowledge of the human perceptual system. Mimicry of human perception is used for dimension reduction and a "cognitive" stage is used to perform the mapping to a quality scale. The cognitive stage is trained by means of one or more databases. These measures include the Bark Spectral Distortion (BSD), see [8], Perceptual Speech Quality (PSQM), see [9], and Measuring Normalizing Blocks (MNB), see [10], [11]. Perceptual evaluation of speech quality (PESQ), see [12], and perceptual evaluation of audio quality (PEAQ), see [13], are standardized state-of-the-art algorithms for intrusive quality assessment of speech and audio, respectively.

Existing intrusive objective speech quality measures may automatically assess the performance of the communication system without the need for human listeners. However, intrusive measures require access to the original signal, which is typically not available in QoS monitoring. For such applications non-intrusive quality assessment must be used. These methods often include both mimicry of human perception and/or a mapping to the quality measure that is trained using databases.

An early attempt towards non-intrusive speech quality measure based on a spectrogram of the perceived signal is presented in [14]. The spectrogram is partitioned, and variance and dynamic range calculated on a block-by-block basis. The average level of variance and dynamic range is used to predict speech quality.

The non-intrusive speech quality assessment reported in [15] attempts to predict the likelihood that the passing audio stream is generated by the human vocal production system. The speech stream under assessment is reduced to a set of features. The parameterized data is used to estimate the perceived quality by means of physiologically based rules.

The measure proposed in [16] is based on comparing the output speech to an artificial reference signal that is appropriately selected from a optimally clustered codebook. In the Perceptual Linear Prediction (PLP), see [17], coefficients are used as a parametric representation of the speech signal. A fifth-order all-pole model is performed to suppress speaker-dependent details of the auditory spectrum. The average distance between the unknown test vector and the nearest reference centroids provides an indication of speech degradation.

Recent algorithms based on Gaussian-mixture probability models (GMM) of features derived from perceptually motivated spectral-envelope representations can be found in [18] and [19]. A novel, perceptually motivated speech quality assessment algorithm based on temporal envelope representation of speech is presented in [20] and [21].

The International Telecommunication Union (ITU) standard for non-intrusive quality assessment, ITU-T P.563, can be found in [22]. A total of 51 speech features are extracted from the signal. Key features are used to determine a dominant distortion class, and in each distortion class a linear combination of features is used to predict a so-called intermediate speech quality. The final speech quality is estimated from the intermediate quality and 11 additional features.

The above listed measures for quality assessment are designed to predict the effects of many types of distortions, and typically have high computational complexity. Such algorithms will be referred to as general speech quality predictors. It has been shown that non-intrusive quality prediction is possible at much lower complexity if it is assumed that the type of distortion is known, see [23]. However, the latter class of measures is likely to suffer from poor prediction performance if the expected working conditions are not met.

SUMMARY

An object of the present invention is a non-intrusive speech-quality assessment method and apparatus having low computational complexity.

This object is achieved in accordance with the attached claims.

The present invention predicts speech quality from generic features commonly used in speech coding (referred to as per-frame features), without an assumption of the type of distortion. In the proposed low-complexity, non-intrusive speech quality assessment method the quality estimate is instead based on global statistical properties of per-frame features.

Briefly, the present invention determines parameters representing frames of the monitored signal. A collection of per-frame feature vectors representing structural information of selected frames is extracted from these parameters. A global feature set is obtained from the collection of feature vectors using predetermined statistical moments of selected feature vector components. Finally, a signal quality measure is predicted from the global feature set.

BRIEF DESCRIPTION OF THE DRAWINGS

The invention, together with further objects and advantages thereof, may best be understood by making reference to the following description taken together with the accompanying drawings, in which.

DETAILED DESCRIPTION

In the following description the invention will be described with reference to speech. However, the same principles can be applied to other signal types, such as audio signals and video signals.

Figure 1:
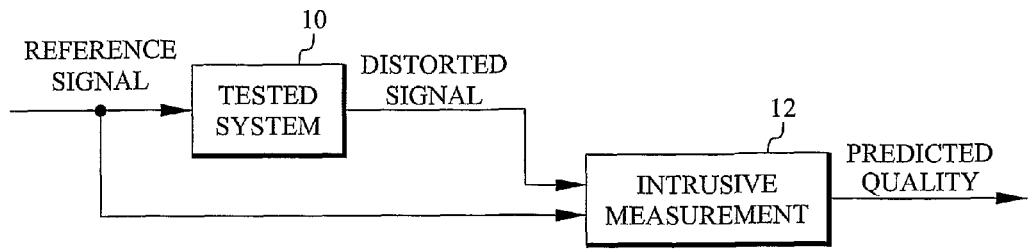
FIG. 1 is a block diagram illustrating intrusive speech quality measurement.
Figure 2:
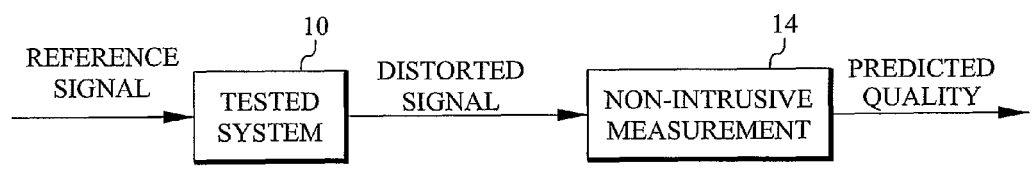
FIG. 2 is a block diagram illustrating non-intrusive speech quality measurement.
Figure 3:
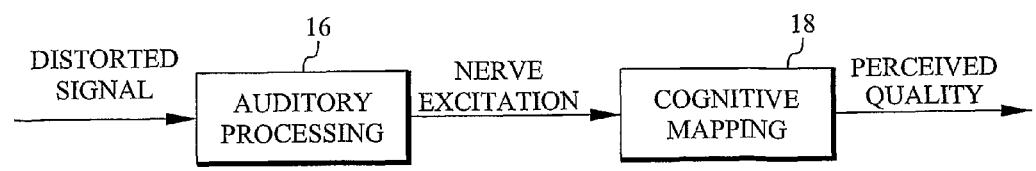
FIG. 3 is a block diagram illustrating human perception of speech quality.

The human speech quality assessment process can be divided into two parts: 1) conversion of the received speech signal into auditory nerve excitations for the brain, and 2) cognitive processing in the brain. This is illustrated in FIG. 3, where a distorted signal is received by an auditory processing block 16, which transforms the signal into nerve excitations that are forwarded to a cognitive mapping block 18, which outputs a signal with a certain perceived quality. The key principles of perceptual transforms are signal masking, critical band spectral resolution, equal-loudness curves, and intensity loudness law, e.g., [24]. These principles are well studied and in most existing quality assessment algorithms a perceptual transform is a pre-processing step. The main implicit purpose of the perceptual transform is to perform a perceptually-consistent dimension reduction on the speech signal. Ideally, a perceptual transformation retains all perceptually-relevant information, and discards all perceptually-irrelevant information. In practice, approximations and simplifications must be made and this goal may not be met. In some cases, perceptual transformations may have high computational cost. To avoid these potential limitations, the assessment method of the present invention does not perform such a perceptual transform. Instead the dimensionality is preferably reduced simultaneously with the optimization of the mapping function coefficients. The goal is to minimize the loss of relevant information. This approach is consistent with the recent emergence of algorithms performing quality assessment without a perceptual transform in image quality assessment [25].

Many of the existing quality assessment algorithms are based on specific models of distortion, i.e., level of background noise, multiplicative noise, presence of ringing tones [22], or simulate a known distortion like handset receiver characteristics [12]. The present invention does not incorporate an explicit model of the distortion. The speech quality estimate is based entirely on the statistics of a processed speech signal, and the distortion is implicitly assessed by its impact on these statistics. As a result, the present invention is easily adapted to the next generation communication systems that will likely produce new types of distortions.

In some methods the speaker-dependent information is removed [18], [16]. However, it is known that telephony systems provide higher quality scores for some voices than for other voices [26]. Therefore, if the algorithm is to be used for continuous network monitoring, and balanced speech material for averaging cannot be guaranteed, the speaker-dependent information is relevant. The method in accordance with the present invention incorporates the speaker-dependent information, for example in the form of the pitch period and the coefficients of a tenth-order autoregressive (AR) model estimated by means of linear prediction.

An utterance used for quality measurements is typically a set of short sentences separated by a pause of, for example, 0.5 seconds. The total length of an utterance is typically approximately 8 seconds. However, in general an utterance may simply be viewed as a speech signal interval or block. The assessment method of the present invention predicts speech quality of an utterance using a simple set of features that may be derived from the speech signal waveform or, in a preferred embodiment, are readily available from speech codecs in the network. The speech quality is predicted at low computational complexity, which makes the method useful for practical applications.

The core of the signal quality assessment method in accordance with the present invention is a multi-dimensional (preferably 11-dimensional for speech; other numbers are also possible and the number of dimensions also depends on the signal type, speech, audio, video, etc) per-frame feature vector $\Phi(n)$, the components of which are defined in APPENDIX I. The speech quality is not predicted directly from the per-frame vector, but from its global statistical properties, described as mean, variance, skew, and kurtosis of the per-frame features over many frames, for example over an utterance. The statistical properties of the per-frame features (referred to as global feature set $\Psi$) form the input for GMM (Gaussian-Mixture probability Model) mapping, which estimates the speech quality level on a MOS scale, as described in detail in APPENDIX III.

Figure 4:
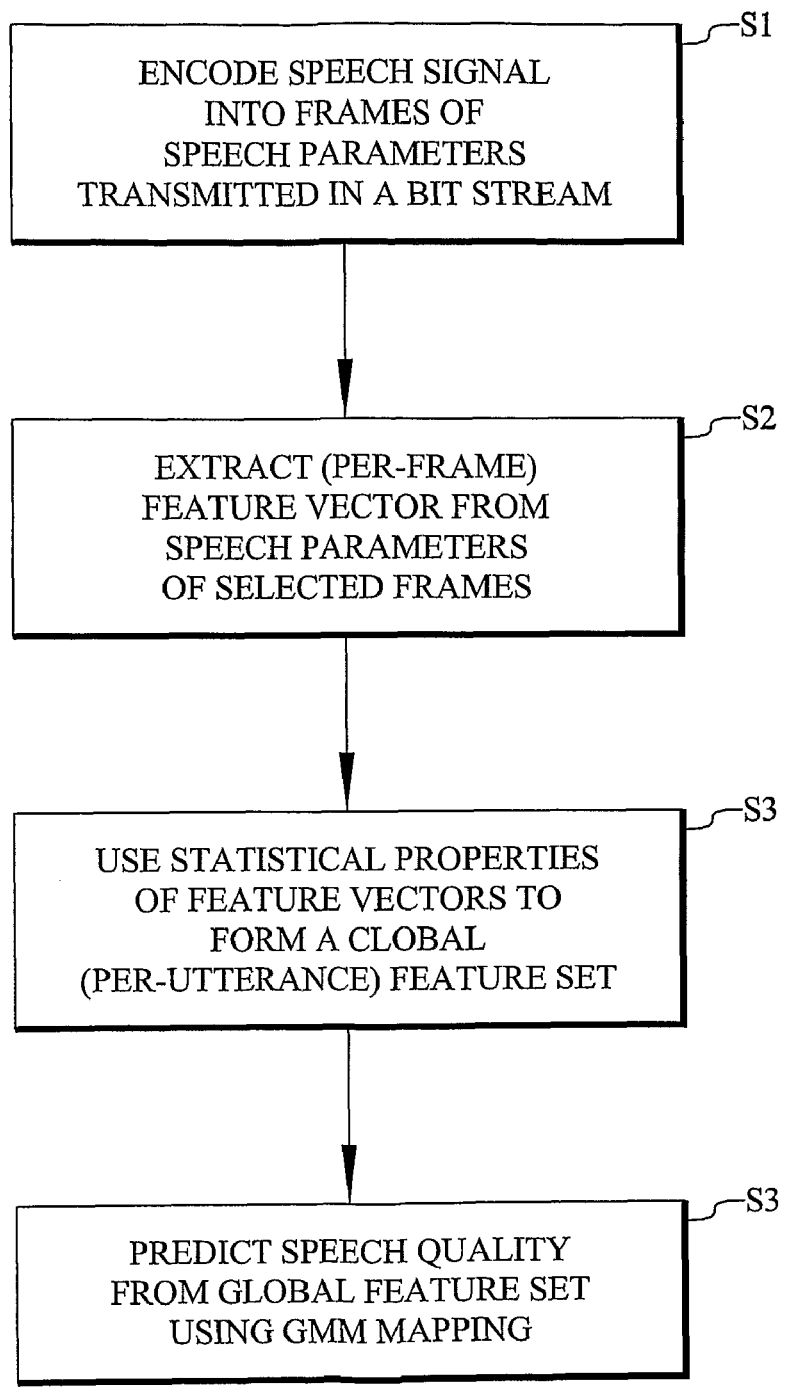
FIG. 4 is a flow chart illustrating the signal quality assessment method in accordance with the present invention.

FIG. 4 is a flow chart illustrating the signal quality assessment method in accordance with the present invention. In step S1 a speech signal is encoded into a bitstream of frames including speech parameters. Step S2 extracts a local (per-frame) feature vector Φ(n) from the speech parameters for each frame of interest. In step S3 the statistical properties of these feature vectors are used to form a global (per-utterance) feature set Ψ. Finally, in step S4 the speech quality is predicted from the global feature set using GMM mapping.

The basis of the signal quality assessment method and apparatus in accordance with the present invention is the extraction of a feature vector. The set of features used aims to capture the structural information from a speech signal. This is motivated by the fact that the natural speech signal is highly structured, and it is likely that human quality judgment relies on patterns extracted from information describing this structure. APPENDIX I defines a set of 11 suitable features, which are collected into a per-frame feature vector:

$$\Phi(n) = (\Phi_1(n), \Phi_2(n), \ldots \Phi_{11}(n)) \quad (1)$$

where n denotes the frame number.

In accordance with the present invention it is assumed that the speech quality can be estimated from statistical properties of these per-frame features. Their probability distributions are described with the mean, variance, skewness, and kurtosis. These statistical moments are calculated independently for each per-frame feature, and this gives a set of features that globally describe one speech utterance (global features):

$$\mu_{\Phi_i} = \frac{1}{|\tilde{\Omega}|} \sum_{n \in \tilde{\Omega}} \Phi_i(n) \quad (2)$$

$$\sigma_{\Phi_i} = \frac{1}{|\tilde{\Omega}|} \sum_{n \in \tilde{\Omega}} (\Phi_i(n) - \mu_{\Phi_i})^2 \quad (3)$$

$$s_{\Phi_i} = \frac{1}{|\tilde{\Omega}|} \frac{\sum_{n \in \tilde{\Omega}} (\Phi_i(n) - \mu_{\Phi_i})^3}{\sigma_{\Phi_i}^{3/2}} \quad (4)$$

$$k_{\Phi_i} = \frac{1}{|\tilde{\Omega}|} \frac{\sum_{n \in \tilde{\Omega}} (\Phi_i(n) - \mu_{\Phi_i})^4}{\sigma_{\Phi_i}^2} \quad (5)$$

Here $\tilde{\Omega}$ denotes the set of frames, of cardinality (size) $|\tilde{\Omega}|$ used to calculate statistics for each of the per-frame features $\Phi_i(n)$. The global features are grouped into one global feature set:

$$\Psi = \{\mu_{\Phi_i}, \sigma_{\Phi_i}, s_{\Phi_i}, k_{\Phi_i}\}_{i=1}^{11} \quad (6)$$

Preferably the complexity of these calculations are reduced. APPENDIX II describes a two-step dimensionality reduction procedure that:

Extracts the "best" subset $\tilde{\Omega}$ of frames out of the set $\Omega$ of all frames in the utterance.

Transforms global feature set Ψ into a global feature set $\tilde{\Psi}$ of lower dimensionality.

In a preferred embodiment of the present invention the per-frame features of the n-th frame are calculated directly from the variance $E^e$ of the excitation of the AR model, the pitch period T and the ten dimensional vector of the line-spectral frequency (LSF) coefficients f, determined over 20 ms speech frames. Since $E^e$, T and f are readily accessible in the network in the case of Code-Excited Linear Prediction (CELP) coders [27], this embodiment of the invention has the additional advantage of extracting the per-frame vector directly from the network parameters in the bit stream, which is simpler than extracting it from the signal waveform. It will be demonstrated that the per-frame features Φ(n) can be calculated from $\{E_n^e, T_n, f_n\}$ and $\{E_{n-1}^e, T_{n-1}, f_{n-1}\}$. Then it will be shown how the global statistical properties are calculated recursively, without storing the per-frame features for the entire utterance in a buffer. The pitch period $T_n$ is calculated according to [40], and the AR coefficients are extracted from the speech signal every 20 ms without overlap.

To keep the complexity of the method low, the per-frame features: spectral flatness, spectral dynamics, and spectral centroid are approximated. The approximations are based entirely on the speech coded bitstream, whereby signal reconstruction is avoided.

In a preferred embodiment of the present invention the spectral flatness is approximated as the ratio of the tenth-order prediction error variance and the signal variance:

$$\Phi_1(n) = \frac{E_n^e}{E_n^s} \quad (7)$$

Given the variance of the excitation of the AR model, its definition $$e_k = s_k - \sum_{i=1}^{10} a_i s_{k-1} \quad (8)$$

and AR coefficients $a_i$, the signal variance is calculated without reconstructing the waveform $s_k$ using the reverse Levinson-Durbin recursion (step-down algorithm).

The spectral dynamics are preferably approximated by a parametric description of the spectrum envelope, for example as a weighted Euclidean distance in the LSF space:

$$\Phi_2(n) = (f_n - f_{n-1})^T W_n (f_n - f_{n-1}) \quad (9)$$

where the inverse harmonic mean weight [41] is defined by the components of the LSF vector:

$$W^{(ii)} = (f_n^{(i)} - f_n^{(i-1)})^{-1} + (f_n^{(i+)} - f_n^{(i)})^{-1} \quad (10)$$

$$W^{(ij)} = 0$$

In a preferred embodiment of the present invention these weights are also used to obtain an approximated spectral centroid:

$$\Phi_3(n) = \frac{\sum_{i=1}^{10} i W_n^{(ii)}}{\sum_{i=1}^{10} W_n^{(ii)}} \quad (11)$$

The selected global features are calculated recursively, i.e., the per-frame features are not stored in a buffer. Until the end of the utterance the mean is recursively updated in accordance with:

$$\mu_\Phi(n) = \frac{n-1}{n}\mu_\Phi(n-1) + \frac{1}{n}\Phi(n) \quad (12)$$

to obtain the desired $\mu_\Phi$. Here n is the index over the accepted frame set $\tilde{\Omega}$, as discussed in APPENDIX II. In a similar fashion, $\Phi^2$, $\Phi^3$ and $\Phi^4$ are propagated to obtain the central moments $\mu_{\Phi^2}, \mu_{\Phi^3}$ and $\mu_{\Phi^4}$. These quantities are used to obtain the remaining global features, namely variance, skew, and kurtosis as:

$$\sigma_\Phi = \mu_{\Phi^2} - (\mu_\Phi)^2 \quad (13)$$

$$s_\Phi = \frac{\mu_{\Phi^3} - 3\mu_\Phi\mu_{\Phi^2} + 2(\mu_\Phi)^3}{\sigma_\Phi^{3/2}}$$

$$k_\Phi = \frac{\mu_{\Phi^4} - 4\mu_\Phi\mu_{\Phi^3} + 6(\mu_\Phi)^2\mu_{\Phi^2} - 3(\mu_\Phi)^4}{\sigma_\Phi^2}$$

Figure 5:
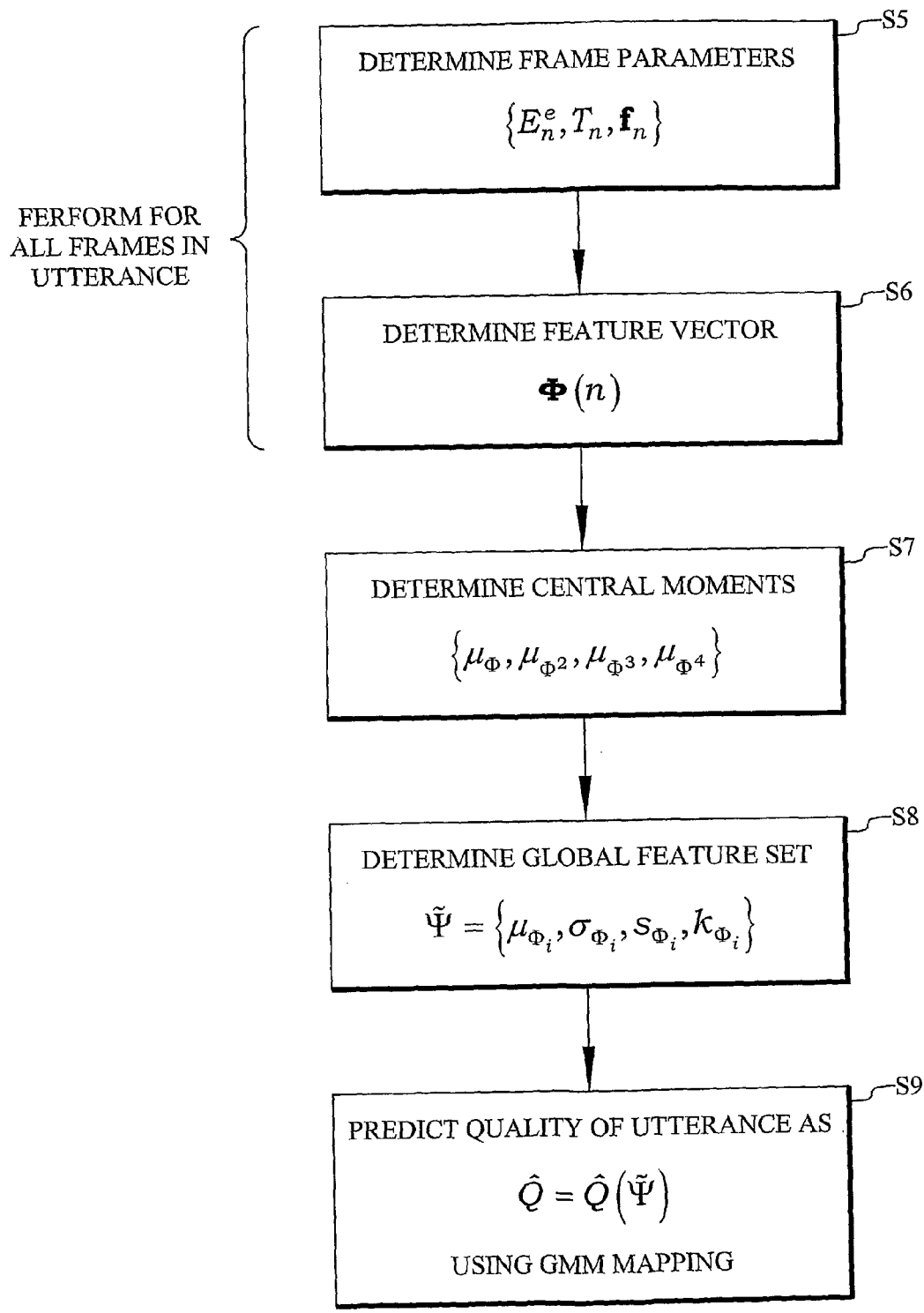
FIG. 5 is a flow chart illustrating a preferred embodiment of the signal quality assessment method in accordance with the present invention.

A preferred embodiment of the method in accordance with the present invention is illustrated in FIG. 5. It includes the following steps:

S5. For the n-th speech frame determine $\{E_n^e, T_n, f_n\}$ from the waveform or extract from the bitstream.

S6. Determine per-frame feature vector $\Phi(n)$, based on $\{E_n^e, T_n, f_n\}$ and the corresponding parameters $\{E_{n-1}^e, T_{n-1}, f_{n-1}\}$ of the previous frame, which are stored in a buffer. Steps S5 and S6 are performed for all frames of the utterance.

S7. From a selected subset $\tilde{\Omega}$ of frames, recursively determine the central moments $\{\mu_{101}, \mu_{\Phi^2}, \mu_{101}{}^3, \mu_{\Phi^4}\}$. Frame selection (APPENDIX II) is controlled by the threshold or multi-dimensional window $\Theta$.

S8. At the end of the utterance calculate the selected (equation (23) of APPENDIX II) global feature set $\tilde{\Psi} = \{\mu_{\Phi_j}, \sigma_{\Phi_j}, s_{\Phi_j}, k_{\Phi_j}\}$ as mean, variance, skew, and kurtosis of per-frame features.

S9. Predict the speech quality of the utterance as a function of the global feature set $\hat{Q} = \hat{Q}(\tilde{\Psi})$ through GMM mapping, as described in APPENDIX III.

Figure 6:
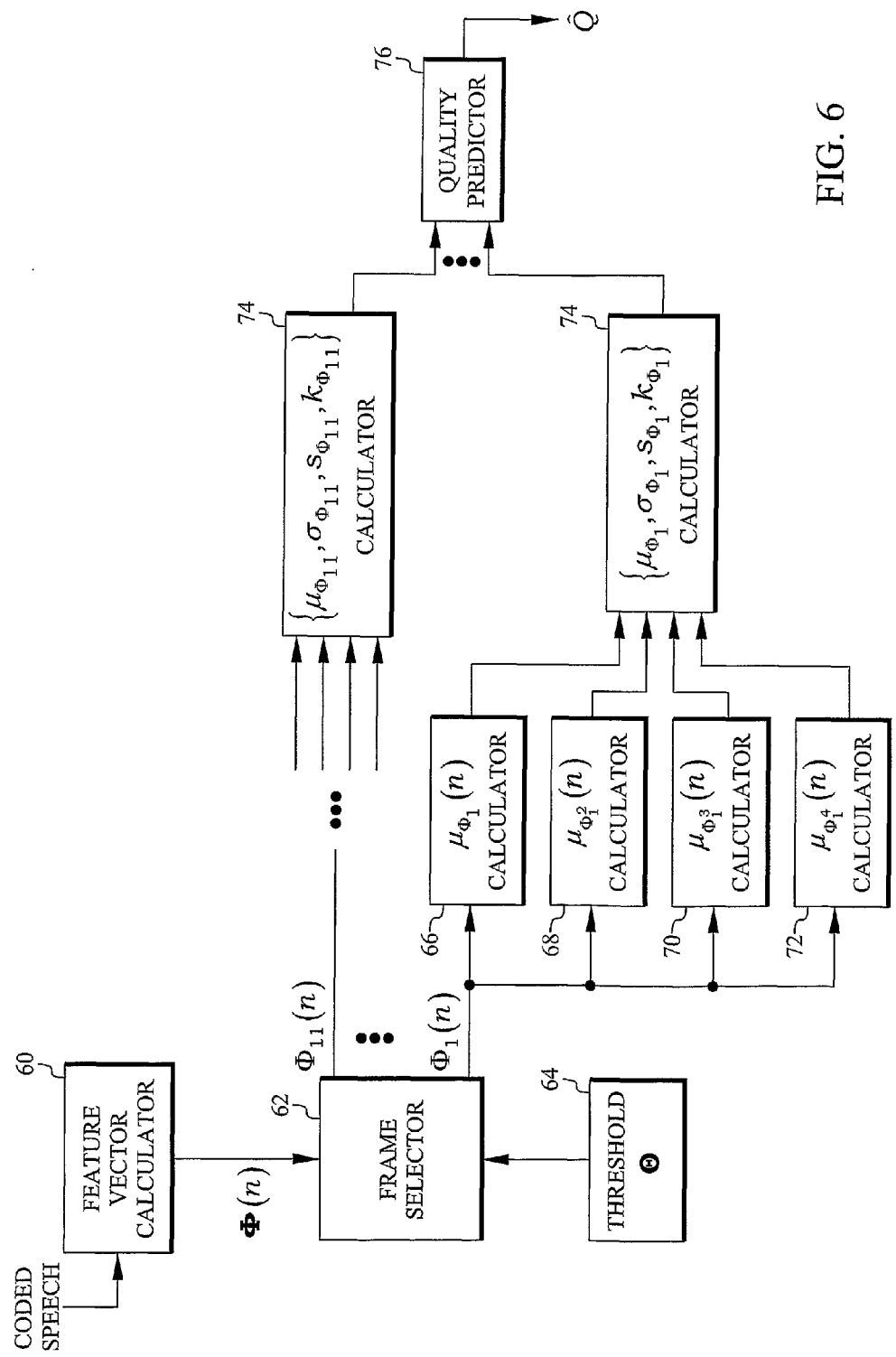
FIG. 6 is a block diagram of a preferred embodiment of the signal quality assessment apparatus in accordance with the present invention.

FIG. 6 is a block diagram of a preferred embodiment of the signal quality assessment apparatus in accordance with the present invention. A coded speech signal (bitstream) is received by a feature vector calculator 60, which determines the feature vector $\Phi(n)$ of the current frame n from speech parameters $\{E_n^e, T_n, f_n\}$. The feature vector is forwarded to a frame selector 62, which determines whether it lies within the multi-dimensional window defined by the threshold $\Theta$, which is stored in storage 64 and has been determined by training, as described in APPENDIX II and IV. The feature vector components $\Phi_1(n), \Phi_2(n), \ldots, \Phi_{11}(n)$ of selected frames are forwarded to respective calculators 66, 68, 70, 72, which recursively calculate central moments of each component. In FIG. 6 only the calculators for $\Phi_1$ have been explicitly illustrated, the corresponding calculators for the remaining components have been indicated by dots. The central moments are forwarded to global feature calculators 74, which determine the global features of each feature vector component in accordance with equation (13). The resulting global feature set is forwarded to a quality predictor, which determines a quality estimate $\hat{Q}$ as described in APPENDIX III.

Actually, in a practical implementation all central moment calculators 66, 68, 79, 72 may not be required for each feature vector component $\Phi_i$, since the dimensionality reduction of global feature set $\Psi$ may reduce the number of required global features, as illustrated by equation (23) in APPENDIX II. In this case calculator 72 for feature vector component $\Phi_1$ may be omitted, since $k_{\Phi_1}$ has been discarded in the dimensionality reduction of global feature set $\Psi$. The actually required central moments depends on the results of the dimensionality reduction of global feature set $\Psi$, which in turn also depends on the signal type (speech, audio, video, etc).

The functionality of the assessment apparatus of the present invention is typically implemented by a micro processor or micro/signal processor combination and corresponding software.

Although the quality prediction performed by the present invention is based on Gaussian-Mixture probability Model mapping, other feasible alternatives are neural networks and hidden Markov models.

The performance of the quality assessment method in accordance with the present invention has been evaluated experimentally. The results are given in APPENDIX V.

An aspect not explicitly covered in the description above is parameters affecting the speech quality, though not directly coupled to the original speech signal. Such parameters are, e.g. background noise to the input speech or the speaker type (e.g. gender) or non-speech input signals like music, or the music style (e.g. pop, jazz, classic, . . . ), or transmission system related parameters such as

- The use of a VAD/DTX system for efficient transmission of inactive speech
- The use (existence) of a noise suppressor prior to or in the course of speech coding
- The speech coding method and its configuration (selected codec and its mode or bit rate)
- Bad frame indicators indicating that a codec frame is partially or completely unusable due to transmission errors
- A likelihood parameter for the occurrence of transmission errors in the received speech bit stream, that can be derived from various processing stages in the receiver
- A possible codec tandeming involving a multitude of decodings and reencodings of the speech signal
- Possible time-scale modification of the speech in conjunction with the use of an adaptive jitter buffer.

These parameters have an immediate influence on the resulting speech quality after decoding. The direct application of the present invention will ignore these parameters, which leads to the advantage of a universal quality assessment method with low complexity.

However, at least some of these parameters are known or may be known a priori or can be deduced by using corresponding detectors or can be obtained by means of signaling through the speech transmission system. As an example, music or background noise conditions or the existence of noise suppression can be detected by using state-of-the-art detection methods. Signaling means are suitable for identifying the other mentioned parameters.

A specific embodiment of the invention making use of the a priori parameters is to use various instances of the quality assessment method in accordance with the present invention, which are trained for different sets of these parameters. According to this embodiment the instance of the assessment method which is most suitable for the presently given set of a priori parameters is first identified and selected. In a second step the selected instance is executed yielding the desired speech quality estimate.

A further embodiment is to execute a single instance of the quality assessment method in accordance with the present invention followed by an additional processing step taking into account the a priori parameters. Specifically, the second step may perform a mapping of the output value of the first step assessment method and the various a priori parameters to the final output speech quality estimate. The mapping of this second step can be done according to known techniques such a linear or non-linear least-squares data fitting methods or GMM mappings. Even a further possibility is combining the final GMM mapping step of the quality assessment method with the described second step mapping, which essentially extends the vector of global (per utterance) features by the set of a priori parameters.

Still a further embodiment for making the method more applicable for non-speech signals, and music in particular, is to allow adaptations of the used local 'per-frame' features. Music in general is not well encoded with speech codecs, since music does not match the underlying speech production model of speech codecs. Rather, music is preferably coded based on perceptual models (of the hearing), not assuming any particular model of the source signal production. Considering this fact, an adaptation of the local 'per frame' features means to preferably use parameters derived from such a perceptual model, at least in addition to the presented parameters. This is particularly the case if the used codec is an audio rather than a speech codec.

Another aspect is that the description above describes the invention in a regression form, which performs a continuous mapping. However, the method is also applicable for a discrete mapping to pre-defined discrete quality scale (pre-defined intervals) by means of using a classifier. Hence, the term 'mapping' should be interpreted in a general sense that also covers the discrete case of using a classifier. A simple example with a classifier is a system based on the described quality assessment method that does not predict the quality on a continuous scale, but has a binary outcome, for example: 0) quality is below a threshold and 1) quality is above a threshold. This example corresponds to a system that has the ability to detect if a particular distortion or quality level is present or not.

The various embodiments of the present invention lead to one ore several of the following advantages:

Speech quality may be predicted from bitstream parameters (in a case of CELP coders), without waveform reconstruction. This, together with the fact that transform to a perceptual domain is not used, leads to low computational and memory requirements (a complexity of a few hundred times lower than the existing ITU standard).

The speech quality is predicted from the statistical properties of the features: spectral flatness, spectral centroids, spectral dynamics, pitch period, signal variance, variance of the excitation signal, and their time derivatives. The statistical properties of these features are described by means of their mean, variance, skew, and kurtosis. This type of features and their description do not require the speech signal to be stored. In a buffer are stored only a few (for example 12) scalar parameters from the previous frame.

A novel method may be used to derive the per-frame features (spectral flatness, spectral dynamics, etc.) directly from the bitstream, without reconstructing the waveform (signal reconstruction is not complex per se, the complexity comes when features are extracted from the reconstructed signal).

The speech quality may be predicted from only a subset of frames. A novel method is used to extract the frames that contain useful information (in the existing quality assessment methods frame rejection is based on a simple energy threshold or voice activity detector). The proposed method generalizes this approach. Different subsets of frames can be used to estimate the statistical properties of different features. Frame rejection is not only a function of energy, but of all per-frame features. The frame selection method may be optimized jointly with the regression function (classifier).

The proposed method significantly outperforms ITU-T P.563 in the performed simulations, with respect to correlation coefficient and root-mean square error.

It will be understood by those skilled in the art that various modifications and changes may be made to the present invention without departure from the scope thereof, which is defined by the appended claims.

APPENDIX I

Feature Selection

This appendix will define a suitable set of features to be included in a per-frame feature vector $\Phi(n)$. This set is especially suitable for speech signals.

A first per-frame feature of interest is a measure representing the information content in the signal, such as the spectral flatness measure described in [28]. This is related to the strength of the resonant structure in the power spectrum and is defined as:

$$\Phi_1(n) = \frac{\exp\left(\frac{1}{2\pi}\int_{-\pi}^{\pi} \log(P_n(\omega))d\omega\right)}{\frac{1}{2\pi}\int_{-\pi}^{\pi} P_n(\omega)d\omega} \quad (14)$$

where the AR (Auto Regressive) envelope P ($\omega$) is defined as the frequency response of the AR model with coefficients $a_k$, i.e.

$$P_n(\omega) = \frac{1}{\left|1 + \sum_{k=1}^{p} a_k^{(n)} e^{-j\omega k}\right|^2} \quad (15)$$

The frame index is denoted by n, and p is the order of linear prediction analysis, typically set to 10 for signals sampled at 8 kHz.

A second per-frame feature is a measure representing signal stationarity, such as the spectral dynamics, defined as:

$$\Phi_2(n) = \frac{1}{2\pi}\int_{-\pi}^{\pi} (\log(P_n(\omega)) - \log(P_{n-1}(\omega)))^2 d\omega \quad (16)$$

The spectral dynamics feature has been studied and successfully used in speech coding [29], [30] and speech enhancement [31].

A third feature of interest is a measure representing the energy distribution of the signal over frequencies, such as the spectral centroid [32], which determines the frequency area around which most of the signal energy concentrates. It is defined as:

$$\Phi_3(n) = \frac{\frac{1}{2\pi}\int_{-\pi}^{\pi} \omega \log(P_n(\omega)) d\omega}{\frac{1}{2\pi}\int_{-\pi}^{\pi} P_n(\omega) d\omega} \quad (17)$$

and it is also frequently used as an approximation of a measure of perceptual "brightness".

Three further per-frame features are the variance of the excitation of the AR model $E_n^e$, the speech signal variance $E_n^s$, and the pitch period $T_n$. They will be denoted as $\Phi_4(n)$, $\Phi_5(n)$, and $\Phi_6(n)$, respectively.

$\Phi_4(n) = E_n^e$, the variance of the excitation of the AR model $\Phi_5(n) = E_n^s$, the speech signal variance (18)

$\Phi_6(n) = T_n$, the pitch period

The per-frame features presented above, and their first time derivatives (except the derivative of the spectral dynamics) are grouped into an 11 dimensional per-frame feature vector $\Phi(n)$, the components of which are summarized in Table I below.

TABLE I

Elements of per-frame feature vector

| Description | Feature | Time derivative of feature |
|---|---|---|
| Spectral flatness | $\Phi_1$ | $\Phi_7$ |
| Spectral dynamics | $\Phi_2$ | — |
| Spectral centroids | $\Phi_3$ | $\Phi_8$ |
| Excitation variance | $\Phi_4$ | $\Phi_9$ |
| Speech variance | $\Phi_5$ | $\Phi_{10}$ |
| Pitch period | $\Phi_6$ | $\Phi_{11}$ |

APPENDIX II

Dimensionality Reduction

Dimensionality reduction may be attained through frame selection, global feature selection or a combination of both selection procedures. One purpose of the dimensionality reduction is to improve predictive accuracy of the quality assessment system by removing irrelevant and redundant data. Another purpose is to reduce computational complexity. The dimensionality reduction presented in this appendix is based on a training procedure that will be described in detail in APPENDIX IV.

A commonly used approach in the quality assessment literature, is to remove non-speech regions based on a voice activity detector or an energy threshold [33]. The present invention suggests a generalization of this concept by considering activity thresholds in all per-frame feature dimensions. The scheme, presented in the frame selection method below allows speech active frames to be excluded if they do not carry information that improves the accuracy of speech quality prediction. The concept of the frame selection algorithm is to accept only frames where the per-frame feature vector $\Phi(n)$ lies inside or on the surface of the 11-dimensional "hyperbox" or multi-dimensional window defined by a threshold vector $\Theta$. In pseudo-code the method may be described by:

Frame Selection Method

| | |
|---|---|
| $\tilde{\Omega} = \{\emptyset\}$ | Initialize subset $\tilde{\Omega}$ to empty set |
| for $n \in \Omega$ | For each frame in original frame set $\Omega$ |
| if $\Phi_1(n) \in [\Theta_1^L, \Theta_1^U]$ & | If feature vector lies within "window" |
| $\Phi_2(n) \in [\Theta_2^L, \Theta_2^U]$ & | |
| $\vdots$ | |
| $\Phi_{11}(n) \in [\Theta_{11}^L, \Theta_{11}^U]$ | |
| then $\tilde{\Omega} = \tilde{\Omega} + \{n\}$ | Add frame $n$ to subset $\tilde{\Omega}$ |

The optimal set of frames is determined by the threshold or multi-dimensional window $\Theta = \{\Theta_i^L, \Theta_i^U\}_{i=1}^{11}$, i.e. $\tilde{\Omega}$ depends on $\Theta$, or $\tilde{\Omega} = \tilde{\Omega}(\Theta)$. We search for the threshold $\theta$ that minimizes the criterion $\epsilon$:

$$\Theta = \underset{\Theta^*}{\text{argmin}} \, \varepsilon(\tilde{\Omega}(\Theta^*)) \quad (19)$$

The criterion $\epsilon$ is calculated as the root-mean-square error (RMSE) performance of the quality assessment method in accordance with the present invention, i.e.:

$$\varepsilon = \sqrt{\frac{\sum_{i=1}^{N}(Q_i - \hat{Q}_i)^2}{N}} \quad (20)$$

where $\hat{Q}$ is the predicted quality, and is $Q$ the subjective quality. Here N is the number of MOS labeled utterances used in the evaluation, see APPENDIX IV. The optimization of the threshold $\Theta$ is based on the entire set of global features $\Psi$. The optimization of $\epsilon$ in (19), with the frame selection algorithm described above, results in the following criterion for the acceptance of the n-th frame:

$$\Phi_5(n) > \Theta_5^L \& \Phi_1(n) < \Theta_1^U \& \Phi_2(n) < \Theta_2^U \quad (21)$$

with the threshold values $\Theta_5^L = 3.10$, $\Theta_1^U = 0.67$, and $\Theta_2^U = 4.21$.

From (21) it is seen that only three per-frame features have significant impact on the frame selection, namely speech variance $\Phi_5$, spectral flatness $\Phi_1$, and spectral dynamics $\Phi_2$. The first and second inequalities in (21) accept only frames with high-energy and a clear formant structure. This suggests that the quality assessment algorithm of the present invention extracts information about the speech quality predominately from voiced speech regions. The third inequality selects only stationary speech regions. The latter result is probably due to distortion being more easily perceived in steady-state regions of the speech signal.

As can be seen by criterion (21), the threshold or multi-dimensional window may have actual restrictions in only a few dimensions. In the other dimensions the window may be regarded as an infinite window. Furthermore, even in the restricted dimensions, the window may have a boundary or threshold only in one direction. In general the multi-dimensional window is more restrictive in frame selection than a pure voice activity detector, which leads to rejection of more frames without information relevant for quality assessment. This in turn leads to a more reliable quality measure.

A feasible alternative to the rectangular window for each dimension is a smother window, for example a Gaussian window, with each Gaussian function having its individual mean and variance. Each vector component would then correspond to a Gaussian function value. A frame would be accepted if the product of these function values exceeds a certain threshold.

The criterion (21) reduces significantly the number of frames processed by the quality assessment algorithm. The number of selected frames varies with speakers and sentences, and typically $\tilde{\Omega}$ contains between 20% and 50% of the total frame set $\Omega$.

Once the optimal subset of frames $\tilde{\Omega}$ has been found, a search for the optimal subset of global features $\tilde{\Psi}$ may be performed. This optimization step is defined as follows: given the original set of global features $\Psi$ of cardinality $|\Psi|$, and the optimal set of frames $\tilde{\Omega}$, select a subset of global features $\tilde{\Psi} \subset \Psi$ of cardinality $|\tilde{\Psi}| < |\Psi|$ that is optimized for the performance of the quality assessment algorithm:

$$\tilde{\Psi} = \underset{\tilde{\Psi}^* \in \Psi}{\operatorname{argmin}} \epsilon(\tilde{\Psi}^*) \tag{22}$$

A full search is the only dimensionality reduction procedure that guaranties that a global optimum is found. However, it is rarely applied due to its computational requirements. The well-known Sequential Forward Selection and Sequential Backward Selection, e.g., [34] are step-optimal only, since the best (worst) global feature is added (discarded), but the decision cannot be corrected at a later stage. The more advanced (L,R) algorithm [35] consists of applying Sequential Forward Selection L times, followed by R steps of Sequential Backward Selection. The Floating Search methods [36] are extensions of the (L,R) search methods, where the number of forward and backward steps is not pre-defined, but dynamically obtained. In our experiments we have used the Sequential Floating Backward Selection procedure, which consists of applying after each backward step a number of forward steps as long as the resulting subsets are better than the previously evaluated ones, as illustrated by the following method:

Sequential Floating Backward Selection Procedure

| | |
|---|---|
| $\tilde{\Psi} = \Psi$ | Initialize to entire set of global features |
| while error does not increase | (by more than a first threshold) |
| $\Psi_{i-} = \underset{\Psi_i \in \tilde{\Psi}}{\operatorname{argmin}} \epsilon(\tilde{\Psi} - \{\Psi_i\})$ | Find the least significant global feature |
| $\tilde{\Psi} = \tilde{\Psi} - \{\Psi_{i-}\}$ | Exclude the feature |
| while error decreases | (by more than a second threshold) |
| $\Psi_{i+} = \underset{\Psi_i \in \tilde{\Psi}}{\operatorname{argmin}} \epsilon(\tilde{\Psi} + \{\Psi_i\})$ | Find the most significant global feature |
| $\tilde{\Psi} = \tilde{\Psi} + \{\Psi_{i+}\}$ | Include the feature |

After optimization of $\epsilon$. in (22), the dimensionality of the global feature set is reduced from 44 to 14, i.e. $|\tilde{\Psi}|=14$, and these elements are:

$$\tilde{\Psi} = \{s_{\Phi_1}, \sigma_{\Phi_2}, \mu_{\Phi_4}, \mu_{\Phi_5}, \sigma_{\Phi_5}, s_{\Phi_5}, \mu_{\Phi_6}, s_{\Phi_7}, \mu_{\Phi_8}, \mu_{\Phi_9}, \sigma_{\Phi_9}, s_{\Phi_9}, \mu_{\Phi_{10}}, \mu_{\Phi_{11}}\} \tag{23}$$

It is noted that all per-frame features are present (through their global features statistical representation) in the set $\tilde{\Psi}$, but the speech signal variance $\Phi_5$, and the derivative of the variance of the excitation signal, $\Phi_9$, are most frequent. Another observation is that global speech features based only on the first three moments are present, and that the global features based on kurtosis seem to be less important.

APPENDIX III

Quality Estimation

Let Q denote the subjective quality of an utterance as obtained from MOS labeled training databases. Construct an objective estimator $\hat{Q}$ of the subjective quality as a function of a global feature set, i.e. $\hat{Q}=\hat{Q}(\tilde{\Psi})$, and search for the function closest to the subjective quality with respect to the criterion:

$$\hat{Q}(\tilde{\Psi}) = \underset{Q^*(\tilde{\Psi})}{\operatorname{argmin}} E\{(Q - Q^*(\tilde{\Psi}))^2\} \tag{24}$$

where $E\{\ \}$ is the expectation operator. The above defined criterion is the probabilistic measure corresponding to (22) in APPENDIX II. It is well known, e.g., [37], that equation (24) is minimized by the conditional expectation:

$$\hat{Q}(\tilde{\Psi}) = E\{Q|\tilde{\Psi}\} \tag{25}$$

and the problem reduces to the estimation of the conditional probability. To facilitate this estimation, the joint density of the global feature variables with the subjective MOS scores may be modeled as a GMM (Gaussian-Mixture probability Model):

$$f(\varphi \mid \lambda) = \sum_{m=1}^{M} \omega^{(m)} N(\varphi \mid \mu^{(m)}, \Sigma^{(m)}) \tag{26}$$

where $\phi=[Q,\tilde{\Psi}]$, m is the mixture component index, $\omega^{(m)}$ are the mixture weights, and $N(\phi|\mu^{(m)},\Sigma^{(m)})$ are multivariate Gaussian densities, with $\mu^{(m)},\Sigma^{(m)}$ being the mean and covariance matrices of the Gaussian densities, respectively. The GMM is completely specified by a set of M mean vectors, covariance matrices and mixture weights:

$$\lambda = \{\omega^{(m)}, \mu^{(m)}, \Sigma^{(m)}\}_{m=1}^{M} \tag{27}$$

and these coefficients are estimated off-line from a large training set using the expectation maximization (EM) algorithm [38]. Details on the data used for training are presented in APPENDIX IV. Experiments have shown that it is sufficient to use 12 full-covariance matrices (14×14), i.e., for dimensionality K=14 and M=12 Gaussians, this corresponds to M(1+K+K(K+1)/2)=1440 training parameters.

Using the joint Gaussian mixture model, the conditional expectation (25) can expressed as a weighted sum of component-wise conditional expectations, which is a well-known property of the Gaussian case [39]. Hence, the optimal quality estimator (25) may be expressed as:

$$\hat{Q}(\tilde{\Psi}) = E\{Q \mid \tilde{\Psi}\} = \sum_{m=1}^{M} u^{(m)}(\tilde{\Psi}) \mu_{Q|\tilde{\Psi}}^{(m)} \tag{28}$$

where

-continued $$u^{(m)}(\Psi) = \frac{\omega^{(m)} N(\Psi \mid \mu_\Psi^{(m)}, \Sigma_{\Psi\Psi}^{(m)})}{\sum_{k=1}^{M} \omega^{(k)} N(\Psi \mid \mu_\Psi^{(k)}, \Sigma_{\Psi\Psi}^{(k)})} \quad (29)$$

and $$\mu_{Q|\Psi}^{(m)} = \mu_Q^{(m)} + \Sigma_{\Psi Q}^{(m)} (\Sigma_{\Psi\Psi}^{(m)})^{-1} (\Psi - \mu_\Psi^{(m)}) \quad (30)$$

with $\mu^{(m)}$, $\mu_Q^{(m)}$, $\Sigma^{(m)}$, $\Sigma_{\Psi Q}^{(m)}$ being the mean, covariance and cross-covariance matrices of $\Psi$ and Q of the m-th mixture component.

APPENDIX IV

Training

For the training and evaluation procedure we used 11 MOS labeled databases provided by Ericsson AB and 7 similarly labeled databases from the ITU-T P.Supp 23 [43]. Data with DMOS scores were excluded from our experiments, e.g., from ITU-T P.Supp 23 we excluded Experiment 2. The speech material in these databases contains utterances in the following languages: English, French, Japanese, Italian and Swedish. The databases contain a large variety of distortions, such as: different coding, tandeming, and modulated noise reference unit (MNRU) [44] conditions, as well as packet loss, background noise, effects of noise suppression, switching effects, different input levels, etc. The total size of the union of databases is 7646 utterances with averaged length 8s.

We split the available databases into two parts, test set and training set. The test set is based on 7 databases from ITUT P.Supp 23 (1328 utterances) and the training set is based on 11 Ericsson's databases (6318 utterances). The test set is not available during the training, but used only for evaluation. The training, used for the dimensionality reduction scheme and performance evaluation experiments is based entirely on the training set. To improve generalization performance we use a training with noise procedure [45]. We create virtual ("noisy") training patterns, by adding zero mean white Gaussian noise, at 20 dB SNR to the global feature set $\Psi$. In this manner for each global feature set we create four virtual sets, and the training is based on the union of the "original" and "noisy" features.

APPENDIX V

Performance Evaluation

This appendix presents results from experiments, with respect to both prediction accuracy and computational complexity of the proposed method. The performance of the proposed method is compared to the standardized ITU-T P.563 method. The estimation performance is assessed using a per-condition correlation coefficient R between the predicted quality $\hat{Q}$ and the subjective quality Q in accordance with the equation:

$$R = \frac{\sum_i (\hat{Q}_i - \mu_{\hat{Q}})(Q_i - \mu_Q)}{\sqrt{\sum_i (\hat{Q}_i - \mu_{\hat{Q}})^2 \sum_i (Q_i - \mu_Q)^2}} \quad (31)$$

where $\mu_Q$ and $\mu_{\hat{Q}}$ are the mean values of the introduced variables, and summation is over the conditions. Table II contains the performance results in terms of the selected performance metric over a test set of 7 databases from ITU-T P.Supp 23. The ITU-T P.Supp 23 Exp 1 contains speech coding distortions, produced by seven standard speech codecs (predominantly using G.729 speech codec [46]) alone, or in tandem configuration. In the ITU-T P.Supp 23 Exp 3 the G.729 speech codec is evaluated under various channel error conditions like frame erasure, random bit error, and background noise. The test results, presented in Table II below clearly indicate that the proposed quality assessment method outperforms the standardized ITUT P.563 method.

Processing time and memory requirements are important figures of merit for quality assessment methods. The method according to the present invention has insignificant memory requirements: a buffer of 12+12 scalar values, calculated from the previous and current frame is needed (future frames are not required), as well as memory for the mixture of 12 Gaussians.

TABLE II

PER-CONDITION CORRELATION COEFFICIENT R

| Database | Language | Invention | ITU-T P.563 |
|----------|----------|-----------|-------------|
| Exp 1 A  | French   | 0.94      | 0.88        |
| Exp 1 D  | Japanese | 0.94      | 0.81        |
| Exp 1 O  | English  | 0.95      | 0.90        |
| Exp 3 A  | French   | 0.93      | 0.87        |
| Exp 3 C  | Italian  | 0.95      | 0.83        |
| Exp 3 D  | Japanese | 0.94      | 0.92        |
| Exp 3 O  | English  | 0.93      | 0.91        |

Table III demonstrate the difference in computational complexity between the proposed quality assessment method and the ITU-T P.563 method. The comparison is between the optimized ANSI-C implementation of the ITU-T P.563 method and a MATLAB® 7 implementation of the invention, both executed on a Pentium 4 machine at 2.8 GHz with 1 GB RAM. The case where input features $\{E_n^e, T_n, f_n\}$ are readily available from codecs used in the network is denoted NET.

TABLE III

EXECUTION TIME (IN S) FOR UTTERANCES OF AVERAGED LENGTH 8 S

| | Execution time (in s) | | |
|---|---|---|---|
| | ITU-T P.563 | Invention | Invention (NET) |
| Time | 4.63 | 1.24 | 0.01 |

REFERENCES

[1] ITU-T Rec. P.830, "Subjective performance assessment of telephone-band and wideband digital codecs," 1996.
[2] ITU-T Rec. P.800, "Methods for Subjective Determination of Transmission Quality," 1996.

[3] ITU-R Rec. BS.1534-1, "Method for the subjective assessment of intermediate quality level of coding systems," 2005.

[4] ITU-R Rec. BS.1284-1, "General methods for the subjective assessment of sound quality," 2003.

[5] ITU-T Rec. G. 107, "The e-model, a computational model for use in transmission planning," 2005.

[6] M. Goldstein, "Classification of methods used for assessment of text-to-speech systems according to the demands placed on the listener," Speech Communication, vol. 16, pp. 225-244, 1995.

[7] S. Quackenbush, T. Barnwell, and M. Clements, Objective Measures of Speech Quality. Prentice Hall, 1988.

[8] S. Wang, A. Sekey, and A. Gersho, "An objective measure for predicting subjective quality of speech coders," IEEE J. Selected Areas in Commun., vol. 10, no. 5, pp. 819-829, 1992.

[9] J. Beerends and J. Stemerdink, "A perceptual speech-quality measure based on a psychoacoustic sound representation," J. Audio Eng. Soc, vol. 42, no. 3, pp. 115-123, 1994.

[10] S. Voran, "Objective estimation of perceived speech quality—Part I: Development of the measuring normalizing block technique," IEEE Trans. Speech, Audio Processing, vol. 7, no. 4, pp. 371-382, 1999.

[11] S. Voran, "Objective estimation of perceived speech quality—Part II: Evaluation of the measuring normalizing block technique," IEEE Trans. Speech, Audio Processing, vol. 7, no. 4, pp. 383-390, 1999.

[12] ITU-T Rec. P. 862, "Perceptual evaluation of speech quality (PESQ)," 2001.

[13] ITU-R. BS. 1387-1, "Method for Objective Measurements of Perceived Audio Quality (PEAQ)," 2001.

[14] Au and K. Lam, "A novel output-based objective speech quality measure for wireless communication," Signal Processing Proceedings, 4th Int. Conf., vol. 1, pp. 666-669, 1998.

[15] P. Gray, M. Hollier, and R. Massara, "Non-intrusive speech-quality assessment using vocal-tract models," in Proc. IEE Vision, Image and Signal Processing, vol. 147, pp. 493-501, 2000.

[16] J. Liang and R. Kubichek, "Output-based objective speech quality," IEEE 44th Vehicular Technology Conf., vol. 3, no. 8-10, pp. 1719-1723, 1994.

[17] H. Hermansky, "Perceptual linear prediction (PLP) analysis of speech," J. Acous. Soc. Amer., vol. 87, pp. 1738-1752, 1990.

[18] T. Falk, Q. Xu, and W.-Y. Chan, "Non-intrusive GMM-based speech quality measurement," in Proc. IEEE Int. Conf. Acous., Speech, Signal Processing, vol. 1, pp. 125-128, 2005.

[19] G. Chen and V. Parsa, "Bayesian model based non-intrusive speech quality evaluation," in Proc. IEEE Int. Conf. Acous., Speech, Signal Processing, vol. 1, pp. 385-388, 2005.

[20] D. Kim, "ANIQUE: An auditory model for single-ended speech quality estimation," IEEE Trans. Speech, Audio Processing, vol. 13, pp. 821-831, 2005.

[21] D. Kim and A. Tarraf, "Enhanced perceptual model for non-intrusive speech quality assessment," in Proc. IEEE Int. Conf. Acous., Speech, Signal Processing, vol. 1, pp. 829-832, 2006.

[22] ITU-T P. 563, "Single ended method for objective speech quality assessment in narrow-band telephony applications," 2004.

[23] M. Werner, T. Junge, and P. Vary, "Quality control for AMR speech channels in GSM networks," in Proc. IEEE Int. Conf. Acous., Speech, Signal Processing, vol. 3, pp. 1076-1079, 2004.

[24] B. C. J. Moore, An Introduction to the Psychology of Hearing. London: Academic Press, 1989.

[25] Z. Wang, A. Bovik, H. Sheikh, and E. Simoncelli, "Image quality assessment: From error visibility to structural similarity," IEEE Trans. Image Process, vol. 13, pp. 600-612, 2004.

[26] R. Reynolds and A. Rix, "Quality VoIP-an engineering challenge," BT Technology Journal, vol. 19, pp. 23-32, 2001.

[27] M. Schroeder and B. Atal, "Code-excited linear prediction (CELP): high-quality speech at very low bit rates," in Proc. IEEE Int. Conf. Acous., Speech, Signal Processing, vol. 10, pp. 937-940, 1985.

[28] S. Jayant and P. Noll, Digital Coding of Waveforms. Englewood Cliffs N.J.: Prentice-Hall, 1984.

[29] H. Knagenhjelm and W. B. Kleijn, "Spectral dynamics is more important than spectral distortion," in Proc. IEEE Int. Conf. Acous., Speech, Signal Processing, vol. 1, pp. 732-735, 1995.

[30] F. Norden and T. Eriksson, "Time evolution in LPC spectrum coding," IEEE Trans. Speech, Audio Processing, vol. 12, pp. 290-301, 2004.

[31] T. Quatieri and R. Dunn, "Speech enhancement based on auditory spectral change," in Proc. IEEE Int. Conf. Acous., Speech, Signal Processing, vol. 1, pp.257-260, 2002.

[32] J. Beauchamp, "Synthesis by spectral amplitude and brightness matching of analyzed musical instrument tones," J. Audio Eng. Soc, vol. 30, pp. 396-406, 1982.

[33] S. Voran, "A simplified version of the ITU algorithm for objective measurement of speech codec quality," in Proc. IEEE Int. Conf. Acous., Speech, Signal Processing, vol. 1, pp. 537-540, 1998.

[34] P. Devijver and J. Kittler, Pattern Recognition: A Statistical Approach. London, UK: Prentice Hall, 1982.

[35] S. Stearns, "On selecting features for pattern classifiers," in Proc. 3rd Int. Conf. on Pattern Recognition, pp. 71-75, 1976.

[36] P. Pudil, F. Ferri, J. Novovicova, and J. Kittler, "Floating search methods for feature selection with nonmonotonic criterion functions," in Proc. IEEE Intl. Conf. Pattern Recognition, pp. 279-283, 1994.

[37] T. Soderstrom, Discrete-time Stochastic Systems. London: Springer-Verlag, second ed., 2002.

[38] A. Dempster, N. Lair, and D. Rubin, "Maximum likelihood from incomplete data via the EM algorithm," Journal Royal Statistical Society., vol. 39, pp. 1-38, 1977.

[39] S. M. Kay, Fundamentals of Statistical Signal Processing, Estimation Theory. Prentice Hall, 1993.

[40] W. B. Kleijn, P. Kroon, L. Cellario, and D. Sereno, "A 5.85 kbps CELP algorithm for cellular applications," in Proc. IEEE Int. Conf. Acous., Speech, Signal Processing, vol. 2, pp. 596-599, 1993.

[41] R. Laroia, N. Phamdo, and N. Farvardin, "Robust and efficient quantization of speech LSP parameters using structured vector quantizers," in Proc. IEEE Int. Conf. Acous., Speech, Signal Processing, vol. 1, pp. 641-644, 1991.

[42] DARPA-TIMIT, "Acoustic-phonetic continuous speech corpus, NIST Speech Disc 1-1.1, " 1990.

[43] ITU-T Rec. P. Supplement 23, "ITU-T coded-speech database," 1998.

[44] ITU-T. Rec. P.810, "Modulated Noise Reference Unit," 1996.

[45] R. Duda, P. Hart, and D. Stork, Pattern Classification. Wiley-Interscience, second ed., 2001.
[46] ITU-T. Rec. G.729, "Coding of speech at 8 kbit/s using conjugate-structure algebraic-code-excited linear prediction (CS-ACELP)," 1996.

The invention claimed is:

1. A computer-implemented, non-intrusive signal quality assessment method, including the steps of:
    receiving an audio signal;
    determining, using a processor, parameters ($E_n^e, T_n, f_n$) representing frames of the signal;
    extracting, using the processor, a collection of per-frame feature vectors ($\phi(n)$) representing structural information of selected frames ($\Omega$) of said audio signal from said parameters;
    determining, using the processor, a global feature set ($\psi$) over said collection of feature vectors ($\phi(n)$) from predetermined statistical moments of selected feature vector components ($\phi_1, \phi_2, \ldots \phi_n$); and
    predicting, using the processor, a signal quality measure (Q) from said global feature set.

2. The method of claim 1, including the step of selecting, using the processor, only frames ($\Omega$) with a feature vector ($\phi(n)$) lying within a predetermined multi-dimensional window ($\Theta$).

3. The method of claim 1, including the step of predicting, using the processor, said audio signal quality measure through Gaussian-mixture probability model mapping.

4. The method of claim 1, including the step of determining, using the processor, said global feature set ($\psi$) from at least some of the statistical properties mean, variance, skew and kurtosis of said selected feature vector components.

5. The method of claim 4, including the step of determining, using the processor, the statistical properties from predetermined central moments ($\mu_\phi, \mu_{\phi 2}, \mu_{\phi 3}, \mu_{\phi 4}$) of said selected feature vector components.

6. The method of claim 5, including the step of recursively determining, using the processor, said predetermined central moments ($\mu_\phi, \mu_{100\ 2}, \mu_{\phi 3}, \mu_{\phi 4}$).

7. The method of claim 1, including the step of obtaining, using the processor, said parameters from a bitstream representing said audio signal.

8. The method of claim 1, including the step of obtaining, using the processor, said parameters from the waveform of said audio signal.

9. The method of claim 1, wherein said audio signal is a speech signal.

10. The method of claim 1, wherein said feature vector includes at least some of the features: spectral flatness ($\phi_1$), spectral dynamics ($\phi_2$), spectral centroids ($\phi_3$), excitation variance ($\phi_4$), signal variance ($\phi_5$), pitch period ($\phi_6$), and their time derivatives ($\phi_7$-$\phi_{11}$).

11. A non-intrusive signal quality assessment apparatus, including:
    a feature vector calculator, implemented by a processor, for determining parameters ($E_n^e, T_n, f_n$) representing frames ($\Omega$) of an audio signal and extracting per-frame feature vectors ($\phi(n)$) representing structural information of said audio signal from said parameters;
    a frame selector, implemented by the processor, for selecting a collection of per-frame feature vectors ($\phi(n)$);
    the processor further configured for determining a global feature set ($\psi$) over said collection of feature vectors ($\phi(n)$) from predetermined statistical moments of selected feature vector components ($\phi_1, \phi_2, \ldots \phi_{11}$);
    a quality predictor, implemented by the processor, for predicting a signal quality measure (Q) from said global feature set ($\psi$).

12. The apparatus of claim 11, wherein said frame selector is arranged to include only frames ($\Omega$) with a feature vector ($\phi(n)$) lying within a predetermined multi-dimensional window ($\Theta$) in said collection.

13. The apparatus of claim 11, wherein said quality predictor is arranged to predict said audio signal quality measure through Gaussian-mixture probability model mapping.

14. The apparatus of claim 11, wherein said processor for determining said global feature set ($\psi$) is arranged to determine at least some of the statistical properties mean, variance, skew and kurtosis of said selected feature vector components.

15. The apparatus of claim 14, wherein said processor for determining said global feature set ($\psi$) is arranged to determine the statistical properties from predetermined central moments ($\mu_\phi, \mu_{\phi 2}, \mu_{\phi 3}, \mu_{100\ 4}$) of said selected feature vector components.

16. The apparatus of claim 15, wherein said processor for determining said global feature set ($\psi$) is arranged to recursively determine said predetermined central moments ($\mu_\phi, \mu_{\phi 2}, \mu_{\phi 3}, \mu_{100\ 4}$).

* * * * *